Feb. 13, 1962  E. S. TAMM  3,021,443
ELECTRIC MOTORS
Filed March 31, 1959

INVENTOR.
Emil S. Tamm
BY
Slough & Slough
ATTORNEYS.

United States Patent Office 3,021,443
Patented Feb. 13, 1962

3,021,443
ELECTRIC MOTORS
Emil S. Tamm, Elyria, Ohio, assignor to The General Industries Company, Elyria, Ohio, a company of Ohio
Filed Mar. 31, 1959, Ser. No. 803,243
2 Claims. (Cl. 310—190)

My invention relates to induction type electrical motors and relates more particularly to means for spanning the gap between adjacent pole tips in the stator of such motors.

Magnetic bridges have been employed in the past in the art in an attempt to improve the performance of shaded pole and capacitor type motors, such as those used for phonograph drive mechanisms, tape recorders, pumps, blowers, and other mechanisms involving the use of fractional and sub-fractional horse-power electric motors.

However, prior designs of such magnetic bridges, with which I am familiar, have presented certain common difficulties. To assure efficient motor operation, the bridges must fit uniformly and tightly between the adjacent pole tips. In the event the bridges are loose and are not tightly retained between the pole tips, they have a tendency to vibrate, causing deleterious noise and occasionally become dislodged. In the event the bridges are tightly wedged between the adjacent pole tips, they are difficult and expensive to assemble, and in some instances, distort the shape of the stator poles in the vicinity of the air gap.

It is an object of my invention to provide improved magnetic bridge means for spanning the gap between adjacent stator pole tips, said means having a positive placement with the said stator poles.

It is another object of my invention to provide a magnetic bridge of the type referred to which will be inexpensive to manufacture, simple to construct, and highly efficient in use.

Another object of my invention is to provide a magnetic bridge of the above type which will provide a consistent and uniform magnetic field between the inductor motor pole tips at all times.

A further object of my invention is to provide a magnetic bridge of the type referred to which will maintain itself firmly in place and independent of any supplementary means of support.

A still further object of my invention is to provide a magnetic bridge of the type referred to which can be assembled to the stator without the distortion of the pole tips.

Other objects of my invention and the invention itself will become clear from the following specification and the appended drawings, in which said drawings.

Figure 1:
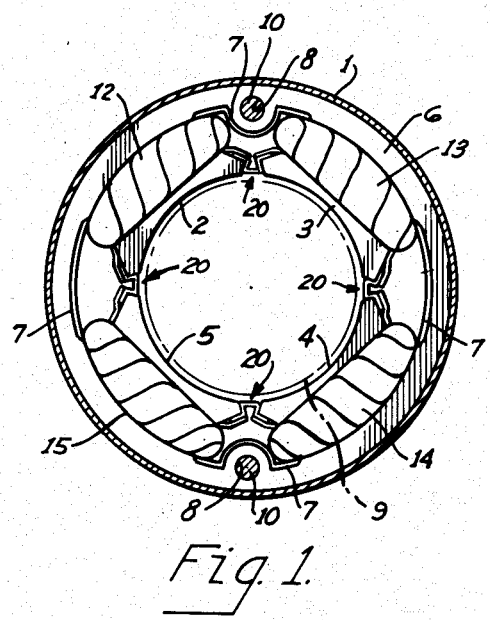
FIG. 1 is an end view of an electric motor showing the housing thereof in section and indicating the armature in broken line.

Referring now to the figures of the drawings, in all of which like parts are designated by like reference characters, in FIG. 1 I show an electric motor encased in a cylindrical housing 1. The motor stator S, as illustrated herein, is of a conventional type comprising a plurality of stacked laminations L and field poles 2, 3, 4, and 5 integrally united by means of a field yoke 6. The field yoke 6 is provided with apertures 8 preferably disposed at opposite sides about the perimeter of the yoke, each adapted to receive a bolt or rod 10 in the usual manner for securing the laminations L together in fixed contiguous relation. Field coils 12, 13, 14, and 15 are wound upon the poles 2 to 5 respectively to energize said poles in a conventional manner. Insulating strips 7 are also provided to insulate the field coils from said stator where the coils pass longitudinally through the stator. The magnetic bridges of my invention, generally indicated at 20, are interposed between adjacent pole tips to bridge the air gaps between said tips.

Figure 4:
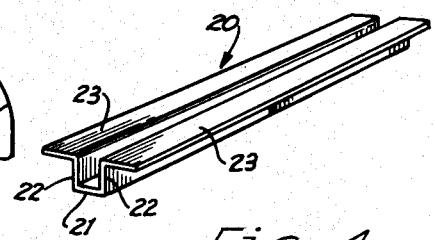
FIG. 4 is a perspective view of my novel magnetic bridge.

Referring now more particularly to FIG. 4, the magnetic bridge 20 of my invention is preferably formed from a strip of flat sheet metal having an inverted, hat-shaped form in cross section throughout its length. The central portion of the bridge provides a flat bottom, U-shaped channel 21 having upstanding wall portions extending therefrom as indicated at 22. At the upper end of the walls 22, the metal is bent outwardly to provide longitudinal flanges 23. The length of the magnetic bridge 20 is such that it extends longitudinally the full length of the stator and the metal from which the magnetic bridge is manufactured is preferably of the type having substantial resilience whereby distortion thereof is possible without creating a permanent fix in the metal.

Figure 2:
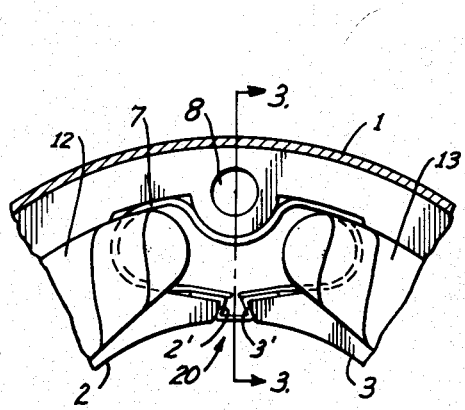
FIG. 2 is an enlarged detail of a portion of the motor shown in FIG. 1.
Figure 3:
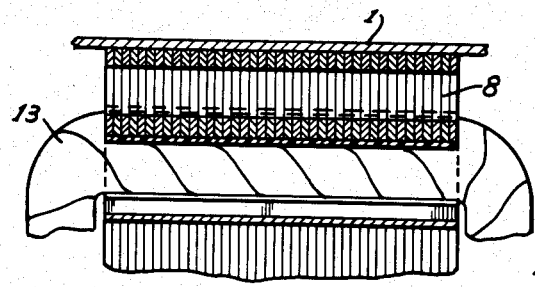
FIG. 3 is a section taken along the line 3—3 of FIG. 2.

The magnetic bridge 20 is preferably inserted between two adjacent field poles by squeezing or pressing inwardly upon the flanges 23 thereof thereby causing the upstanding walls 22 to converge in an upward direction. As best shown in FIG. 2, the extreme ends of the poles 2 and 3 preferably converge upwardly whereby the inserted magnetic bridge 20 conforms and is complementary thereto. The flanges 23, as shown, extend over the upper edges of the pole tips and are thus interposed between said pole tips and the insulating strip 7. It will be understood that the magnetic bridges inserted between the poles 3—4, 4—5, and 5—2 are secured in the same manner as the bridge shown between the poles 2 and 3, the latter poles being detailed in FIG. 2 for the purpose of illustrating the manner in which all of the poles are mounted.

It will be noted that the resilience of the magnetic bridge 20 provides laterally outwardly reactive forces which press the upstanding walls 22 firmly against the edges 2′ and 3′ of the poles 2 and 3 respectively and that the diverging form of the edges 2′ and 3′ creates a downward component of force which causes the magnetic bridge to be biased downwardly to hold the flanges 23 firmly against the upper edges of the pole tips. Each magnetic bridge is, thus maintained, after seating the same between adjacent poles, firmly and tightly against the pole tips exerting a continuous force upon the same. The bridge thus has a great resistance to the effects of vibration and provides a consistent and uniform magnetic field between the adjacent pole tips.

Due to the wedge-like shape of the bridge of my invention, as best shown in FIG. 2, displacement of the bridge in ordinary use is impossible since it cannot move either upwardly or downwardly, and hence does not require cementing to position it in place nor need any supplemental means of support. It can be inserted or removed with the simplest tools, such as a pair of pliers, and such insertion or removal can be made without disturbing either the field coils 12 to 15 or the insulating strip 7. The inherent resilience of the metal of the bridge and its shape holds it firmly and constantly in place without danger of distorting or damaging the pole tips in any way.

It will be understood that numerous changes may be made in my invention, such as changes in size and dimension without departing from the spirit thereof or the scope of the appended claims.

What I claim is:

1. A magnetic bridge inserted between adjacent pole tips of an electric motor stator, said pole tips having adjacent, upwardly converging edges, said magnetic bridge formed of resilient material and comprising a flat-bottomed, channel-shaped member having upstanding walls and laterally projecting flanges at the upper edges of said walls, said bridge resiliently distorted whereby said walls converge upwardly complementarily with said converging edges of said pole tips and exert a lateral reactive force thereupon, said flanges projecting laterally above said pole tips, said converging edges of said poles and said resiliently distorted walls resulting in a downward component of force tending to urge said magnetic bridge downwardly whereby said flanges are held resiliently against said pole tips.

2. A magnetic bridge adapted to be inserted between the adjacent pole tips of an electric motor stator, said pole tips having adjacent edges converging in a direction radially outwardly from the center of said motor, said magnetic bridge having resilient side walls and resilient laterally projecting flanges whereby when said bridge is inserted between said pole tips by distorting said resilient side walls, said bridge will be frictionally held in place due to the resistance of the converging pole tips to outward movement of said bridge and due to the reactive force of said flanges on the radially outwardly directed edges of said pole tips.

References Cited in the file of this patent

UNITED STATES PATENTS

| | | |
|---|---|---|
| 2,610,993 | Stark | Sept. 16, 1952 |
| 2,659,831 | Lautner | Nov. 17, 1953 |
| 2,815,460 | Jones et al. | Dec. 3, 1957 |
| 2,889,573 | Wesolowski | Aug. 11, 1959 |

FOREIGN PATENTS

| | | |
|---|---|---|
| 888,580 | Germany | Sept. 3, 1953 |